US008710397B2

(12) United States Patent
Jehnert et al.

(10) Patent No.: US 8,710,397 B2
(45) Date of Patent: Apr. 29, 2014

(54) ELECTRODE FOR A PLASMA TORCH

(75) Inventors: Katrin Jehnert, Sonnewalde (DE); Martin Kroschwald, Groβschirma (DE); Frank Laurisch, Finsterwalde (DE); Ralf-Peter Reinke, Finsterwalde (DE); Thomas Steudtner, Sonnewalde (DE); Volker Krink, Finsterwalde (DE)

(73) Assignee: Kjellberg Finsterwalde Plasma and Maschinen GmbH, Finsterwalde (DE)

( * ) Notice: Subject to any disclaimer, the term of this patent is extended or adjusted under 35 U.S.C. 154(b) by 0 days.

(21) Appl. No.: 13/139,174

(22) PCT Filed: Nov. 27, 2009

(86) PCT No.: PCT/DE2009/001692
§ 371 (c)(1), (2), (4) Date: Jun. 16, 2011

(87) PCT Pub. No.: WO2010/037380
PCT Pub. Date: Apr. 8, 2010

(65) Prior Publication Data

US 2011/0240609 A1 Oct. 6, 2011

(30) Foreign Application Priority Data

Dec. 18, 2008 (DE) ........................ 10 2008 062 731

(51) Int. Cl.
*B23K 10/00* (2006.01)

(52) U.S. Cl.
USPC ... 219/121.52; 219/119; 219/75; 219/121.39; 313/231.41

(58) Field of Classification Search
CPC ........................................................ H05H 1/34
USPC ............. 219/121.39, 121.45, 121.48, 121.52, 219/119; 213/231.41, 231.51; 313/231.41, 313/231.51
See application file for complete search history.

(56) References Cited

U.S. PATENT DOCUMENTS 5,023,425 A 6/1991 Severance, Jr.
5,083,005 A 1/1992 Degrigny ................. 219/121.52
(Continued)

FOREIGN PATENT DOCUMENTS

DD 87 361 A1 1/1972
DD 87361 1/1972
(Continued)

OTHER PUBLICATIONS

International Preliminary Report on Patentability and Written Opinion of the International Searching Authority (PCT Chapter 1) for PCT/DE2009/001692.

(Continued)

*Primary Examiner* — Mark Paschall
(74) *Attorney, Agent, or Firm* — Jonathan M. D'Silva; MacDonald, Illig, Jones & Britton LLP

(57) ABSTRACT

An electrode for a plasma torch and a plasma torch head comprise an elongated electrode holder with a front surface on the electrode tip and a hole arranged in the electrode tip along a central axis through the electrode holder, and an emission insert arranged in the hole such that an emission surface of the emission insert is exposed. The emission surface is set back relative to the front surface of the electrode holder. An electrode for a plasma torch and a plasma torch head also comprise an electrode socket and an electrode holder, the electrode socket having an internal thread, and the electrode holder having an external thread and an O-ring in a groove in the cylindrical outer surface. The electrode holder is screwed together with the electrode socket via the external thread and the internal thread and sealed by means of the O-ring.

28 Claims, 11 Drawing Sheets

(56) References Cited

U.S. PATENT DOCUMENTS

| | | | | | |
|---|---|---|---|---|---|
| 5,083,055 | A | | 1/1992 | Hokanson | |
| 5,140,130 | A | | 8/1992 | Sakuragi et al. | 219/121.5 |
| 5,601,734 | A | * | 2/1997 | Luo et al. | 219/121.52 |
| 5,951,888 | A | | 9/1999 | Oakley | 219/121.52 |
| 6,114,650 | A | | 9/2000 | Marner et al. | |
| 6,329,627 | B1 | | 12/2001 | Walters | 219/121.52 |
| 6,424,082 | B1 | | 7/2002 | Hackett et al. | 313/231.31 |
| 6,583,378 | B1 | | 6/2003 | Yamaguchi et al. | 219/121.52 |
| 6,841,754 | B2 | * | 1/2005 | Cook et al. | 219/121.48 |
| 7,659,488 | B2 | | 2/2010 | Cook et al. | 219/121.52 |
| 8,101,882 | B2 | * | 1/2012 | Mather et al. | 219/121.52 |
| 2005/0092728 | A1 | | 5/2005 | Barbeau et al. | 219/229 |
| 2006/0049150 | A1 | | 3/2006 | Severance, Jr. | 219/121.52 |
| 2007/0125755 | A1 | | 6/2007 | Mather | 219/121.52 |

FOREIGN PATENT DOCUMENTS

| | | | |
|---|---|---|---|
| DE | 1920411 | B2 | 4/1969 |
| DE | 19 20 411 | B2 | 7/1977 |
| DE | 37 87 804 | T2 | 12/1988 |
| DE | 69014289 | | 1/1990 |
| DE | 690 14 289 | T2 | 6/1995 |
| DE | 695 12 247 | T2 | 1/2000 |
| DE | 69512247 | | 1/2000 |
| DE | 699 37 323 | T2 | 7/2008 |
| DE | 69937323 | | 7/2008 |
| EP | 0410875 | | 1/1991 |
| EP | 0 772 957 | B1 | 9/1999 |
| EP | 1765046 | | 3/2007 |
| WO | WO96/04771 | | 7/1995 |
| WO | WO02/74023 | | 3/2002 |

OTHER PUBLICATIONS

International Search Report—PCT/DE2009/001692.

Brochure HiFocus 280i and 360i, Plasma Cutting Units, Kjellberg Finsterwalde, 2006.

* cited by examiner

ELECTRODE FOR A PLASMA TORCH

BACKGROUND

The invention relates to an electrode for a plasma torch and a plasma torch head with said plasma torch.

A plasma is an electrically conductive gas consisting of positive and negative ions, electrons and excited and neutral atoms and molecules heated thermally to a high temperature. Various gases are used as plasma gases, such as mono-atomic argon and/or the diatomic gases hydrogen, nitrogen, oxygen or air. These gases are ionised and dissociated by the energy of an electric arc. An electric arc can be constricted by a nozzle and is then referred to as a plasma jet.

The parameters of a plasma jet can be heavily influenced by the design of a nozzle and electrode. Such parameters of a plasma jet include, for example, the diameter of a jet, temperature, energy density, and gas flow rate.

In plasma cutting, for example, plasma is constricted by a nozzle, which can be cooled by gas or water. In this way, energy densities of up to $2\times10^6$ W/cm$^2$ can be achieved. Temperatures of up to 30,000° C. can arise in a plasma jet, which, in combination with the high flow rate of the gas, make it possible to achieve very high cutting speeds on materials.

Due to the high thermal stresses they encounter, nozzles used are usually made from a metallic material, preferably copper, to benefit from high electrical conductivity and thermal conductivity. The same is true of electrode holders, though electrode holders may also be made of silver. A nozzle can then be inserted into a plasma torch, the main elements of which are a plasma torch head, a nozzle cap, a plasma gas conducting member, a nozzle, a nozzle holder, an electrode quill, an electrode holder with an electrode insert and, in modern plasma burners, a holder for a nozzle protection cap and a nozzle protection cap. The electrode holder can fix a pointed electrode insert, known as an emission insert, made from tungsten, which is suitable when non-oxidizing gases, such as a mixture of argon and hydrogen, are used as the plasma gas. A flat-tip electrode, the electrode insert of which is made of hafnium, is also suitable when oxidizing gases, such as air or oxygen, are used as the plasma gas.

The nozzle and electrode are often cooled with a liquid, such as water, to achieve a extend service life. Such cooling can also be effected with a gas. This leads to a recognized distinction between liquid-cooled and gas-cooled plasma torches.

An electrode can comprise an electrode holder, which can be made from a material with good electric and thermal conductivity, e.g. copper and silver or their alloys, and an emission insert consisting of a temperature-resistant material, e.g. tungsten, zirconium, or hafnium. For plasma gases containing oxygen, zirconium can be used, though hafnium may be better suited due to superior thermal properties, since the oxide of hafnium is more temperature-resistant.

To improve electrode service life, a temperature-resistant material can be introduced into the holder as an emission insert, which is then cooled. Normally, the most effective form of cooling is liquid cooling.

Former East Germany document DD 87361 B1 describes an apparatus utilizing an electrode (cathode) for oxidising gas. A disclosed cathode (emission insert) consists of a material, e.g. zirconium, the oxide of which is temperature-resistant and which is inserted into a cathode holder made of copper. A disclosed cathode holder is cooled from the inside by a cooling water channel. DD 87361 B1 also describes the problem of limited endurance (short service life) of the cathode, caused by the rotation of the plasma gas, which is necessary for cut quality. The cathode holder has a collar with a gas conducting ring arranged around it, which has gas channels incorporated in it to divide the plasma gas into a partial stream and a main stream, forming the main stream on the side facing the nozzle and causing it to rotate while the partial stream on the side facing the cathode holder rotates in the opposite direction. Alternatively, the collar of the cathode holder may have recesses serving to form and deflect a partial gas stream. The intended effect is to create a calmed gas zone upstream of the emission insert to reduce its wear. However, such method results in cut quality that is inferior to those obtained utilizing powerfully rotating plasma gas.

German documents DE 690 14 289 T3 and DE 699 37 323 T2 disclose electrode arrangements in which a sleeve (separator) is attached around an emission insert, which separates the emission insert from an electrode holder. In such arrangement, the separator consists mainly of silver and the electrode holder mainly of copper. The utilized silver ensures long service life, especially when cutting with pure oxygen, because silver reacts more inertly with oxygen than does copper. However, such electrode arrangements have the significant disadvantage of being complex to manufacture.

German document DE 695 12 247 T2 discloses an apparatus in which the emission surface of an emission insert is initially shaped such that it determines a recess in the emission insert, having an initial depth in the central axis proportional to the cutting stream and the diameter of the emission insert. Such recess causes deposits of emission material on the inside surface of the nozzle resulting from the ignition and operation of the plasma arc to be reduced. Studies have shown, however, that such arrangements cannot actually extend apparatus service life.

SUMMARY

The invention increases the service life of an electrode, especially the emission insert, for a plasma torch while reducing the required effort of production. In one contemplated embodiment, an electrode for a plasma torch or a plasma torch head comprises an elongated electrode holder with a front surface on the electrode tip and a hole positioned in the electrode tip along a central axis through the electrode holder. An emission insert is arranged in the hole such that an emission surface of the emission insert is exposed, the emission surface being set back relative to the front surface of the electrode holder. In a further contemplated embodiment, an electrode for a plasma torch or a plasma torch head comprises an electrode socket and an electrode holder, the electrode socket having an internal thread, and the electrode holder having an external thread and a groove in the cylindrical outer surface. The electrode holder is screwed into the electrode socket via the external thread and the internal thread and sealed by means of an O-ring. The O-ring may be disposed in the groove for sealing purposes. By setting back the emission surface relative to the front surface of the electrode holder, the service life of the electrode is increased.

Further features and advantages of the invention will become clear from the attached claims and the following description, in which a number of sample embodiments of the invention are illustrated in detail with reference to the schematic drawings.

DETAILED DESCRIPTION

Figure 1:
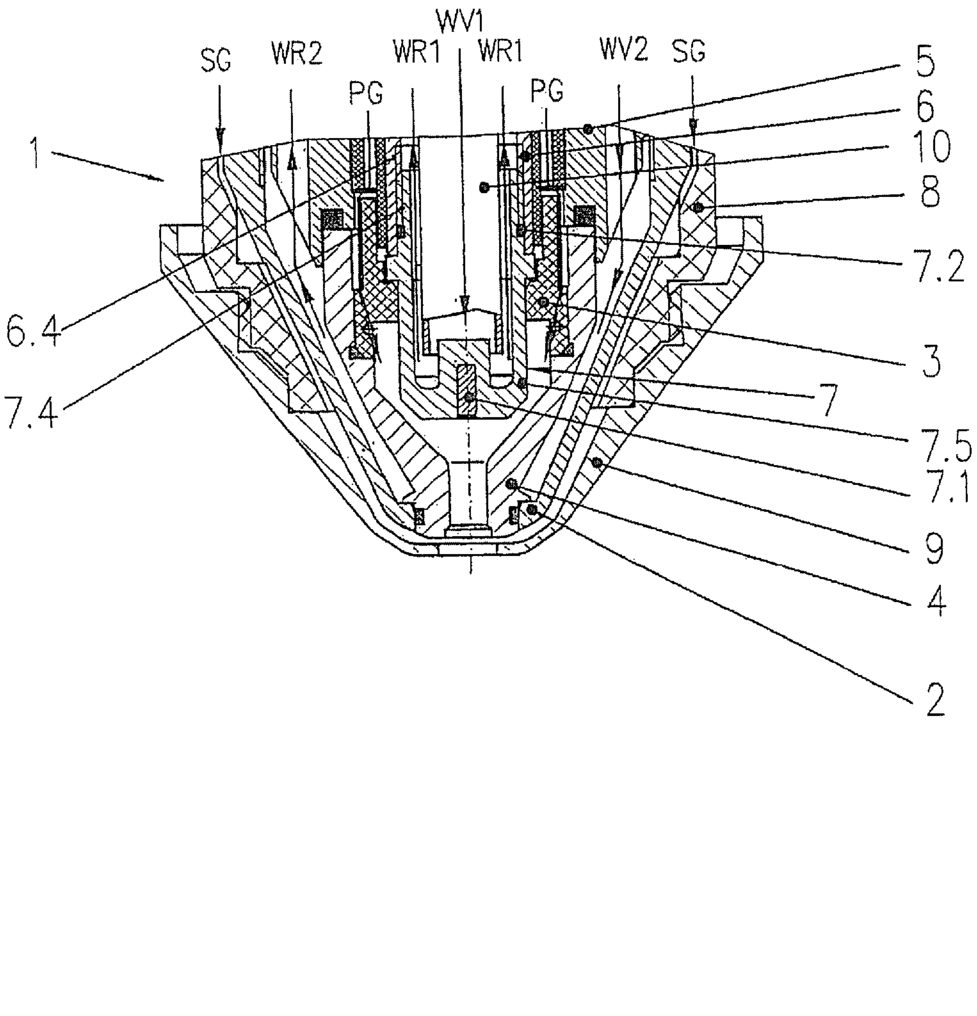
FIG. 1 depicts a longitudinal cross section through a plasma torch head in accordance with a particular embodiment of the invention, in which both better centring and/or sealing of the electrode and a special emission insert are provided in order to extend the service life and improve the operating safety of the plasma torch.

For a more complete understanding and appreciation of this invention, and many of its advantages, reference will be made to the following detailed description taken in conjunction with the accompanying drawings. Referring to the drawings, similar reference numbers are used to designate the same or corresponding parts throughout the several embodiments and figures.

Referring to FIG. 1, a plasma torch head 1 according to one contemplated embodiment of the invention includes a nozzle 4, an electrode 7, which is a flat-tip electrode having an electrode holder 7.5 with an external thread 7.4 and an emission insert 7.1, and a gas conductor 3. The nozzle 4 is fixed in position by a nozzle holder 5 and a nozzle cap 2. An electrode socket 6 receives the electrode holder 7.5 via an internal thread 6.4. The gas conductor 3 is located between the electrode 7 and the nozzle 4 and causes a plasma gas PG to rotate. The plasma torch head 1 has water cooling, which flows through the electrode interior by means of a cooling tube 10 from the coolant supply (WV1) to the coolant return (WR1) and the nozzle 4 in the space between the nozzle 4 and the nozzle cap 2 from the coolant supply WV2 to the coolant return WR2. In addition, the plasma torch head 1 has a nozzle protection cap 9, which in this embodiment is screwed onto a nozzle protection cap holder 8. The secondary gas, which protects the nozzle 4, especially the nozzle tip, flows between the nozzle protection cap 9 and the nozzle cap 2.

Figure 2:
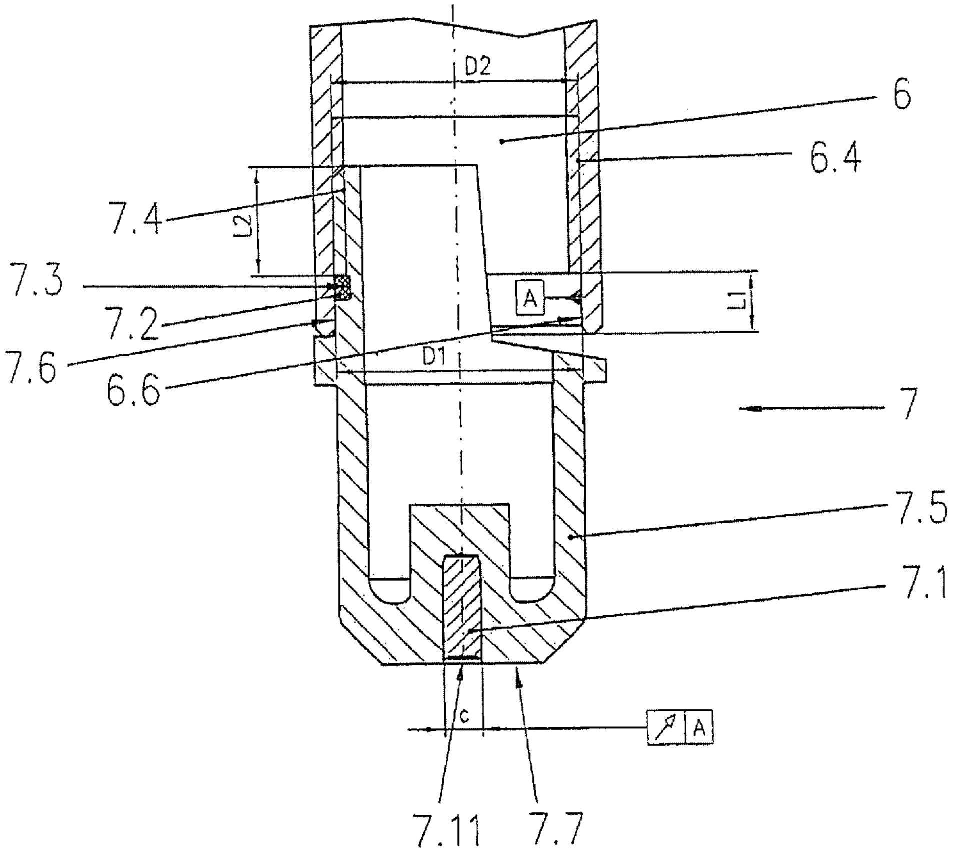
FIG. 2 depicts cross sectional details of the improved centring and sealing of the electrode shown in FIG. 1.

Referring now to FIG. 2, improved centring and sealing of the electrode 7 is depicted vis-à-vis the electrode holder 7.5. On the side-facing electrode socket 6, the electrode 7 includes external thread 7.4, a groove 7.3 for receiving an O-ring 7.2, and a cylindrical outer surface 7.6 which is a centring surface. The cylindrical outer surface 7.6 has a narrow tolerance with the cylindrical internal surface 6.6 (centring surface) of the electrode socket 6. This is achieved, for example, by means of a loose fit H7/h6 in accordance with DIN ISO 286 of the type commonly used for centring. The combination of these features creates good centricity between the electrode 7 and the electrode socket 6, and hence the plasma torch, and further achieves reliable sealing.

Figure 3:
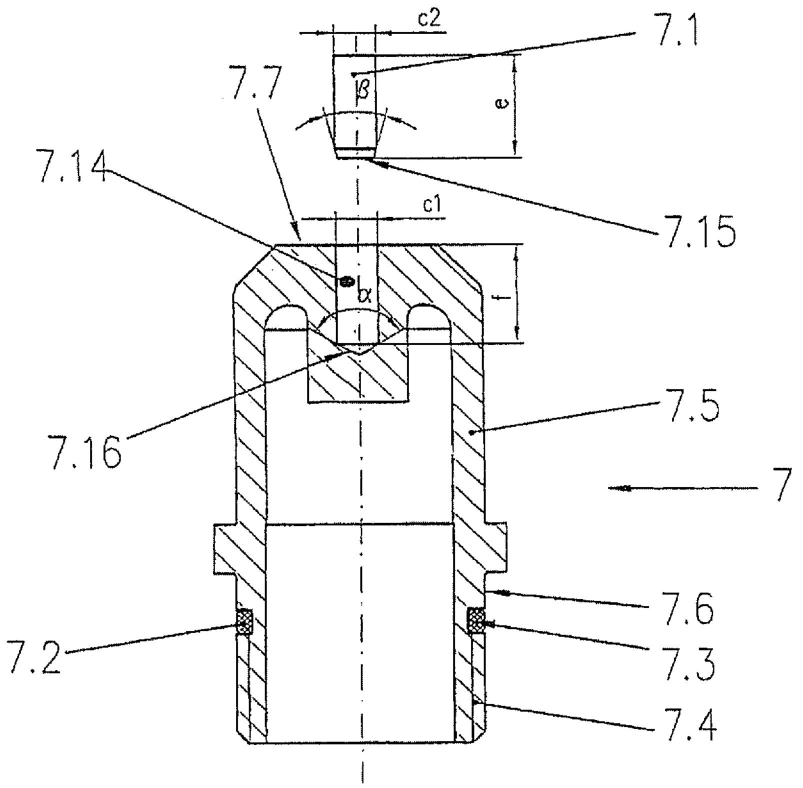
FIG. 3 depicts an electrode holder before the introduction of an emission insert.
Figure 4:
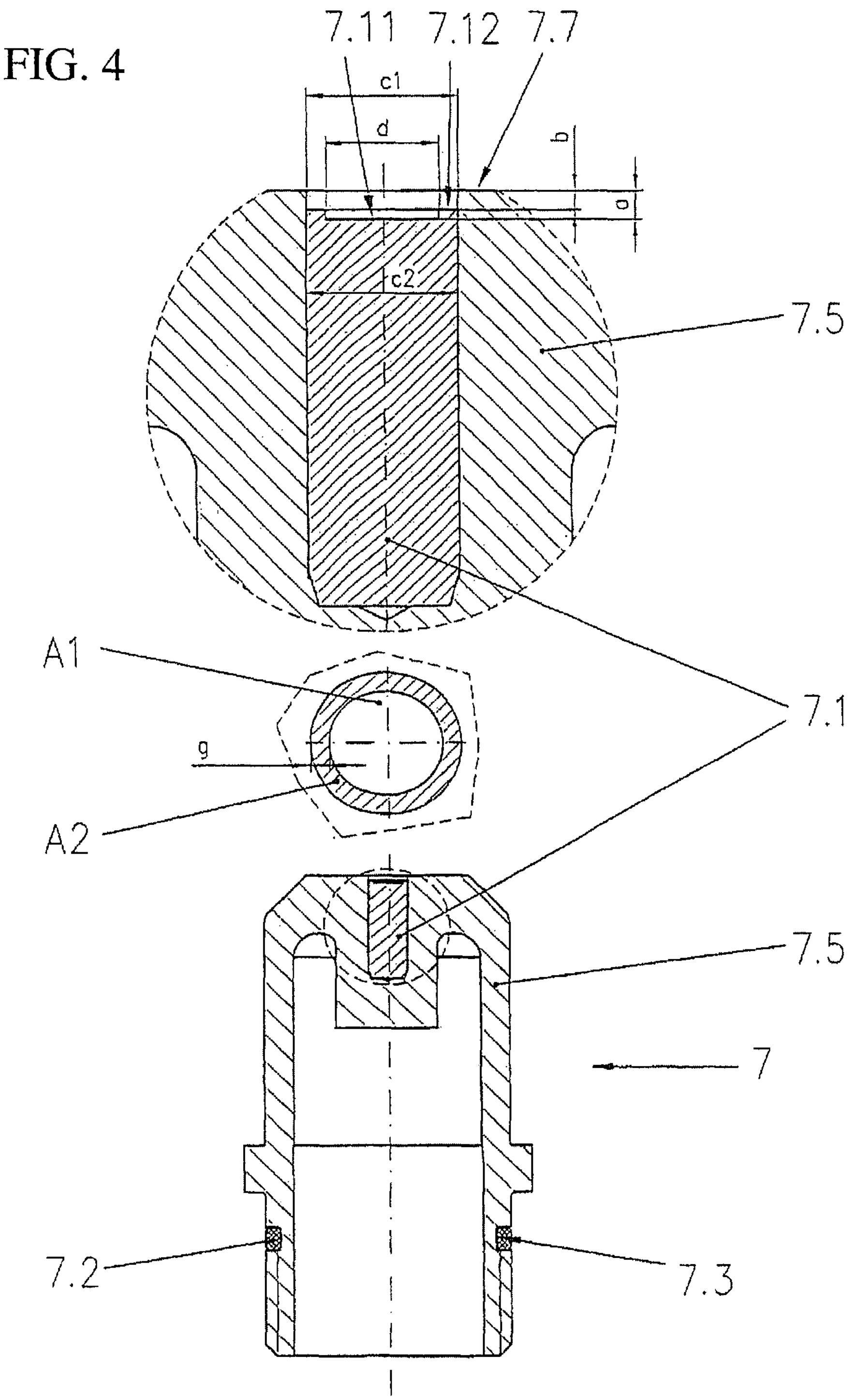
FIG. 4 depicts a view of an embodiment electrode of the invention in a longitudinal cross section and details of the emission inserts in a longitudinal cross section and in a view from the front.
Figure 5:
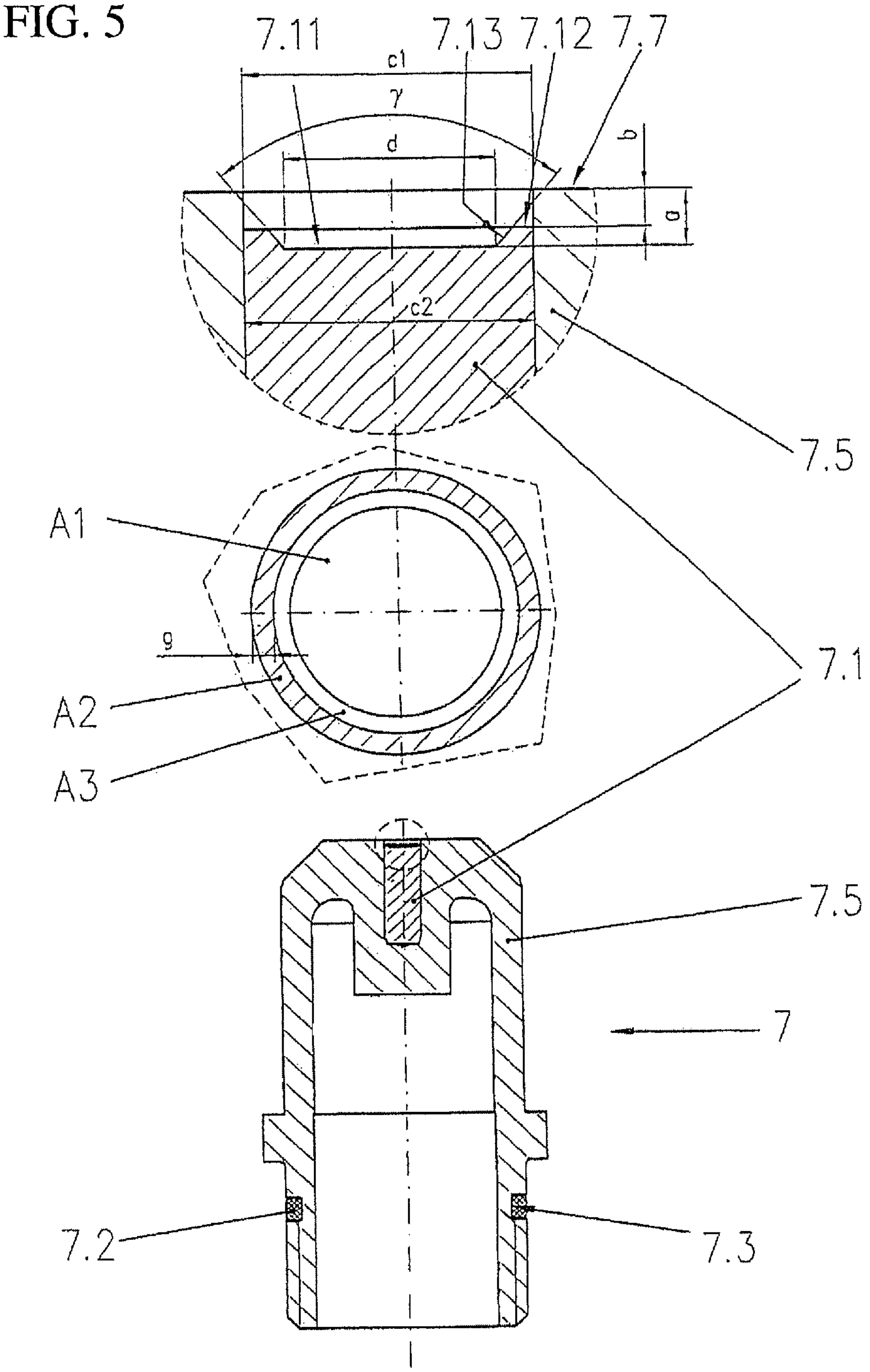
FIG. 5 depicts a view of an embodiment electrode of the invention in a longitudinal cross section and details of the emission inserts in a longitudinal cross section and in a view from the front.
Figure 6:
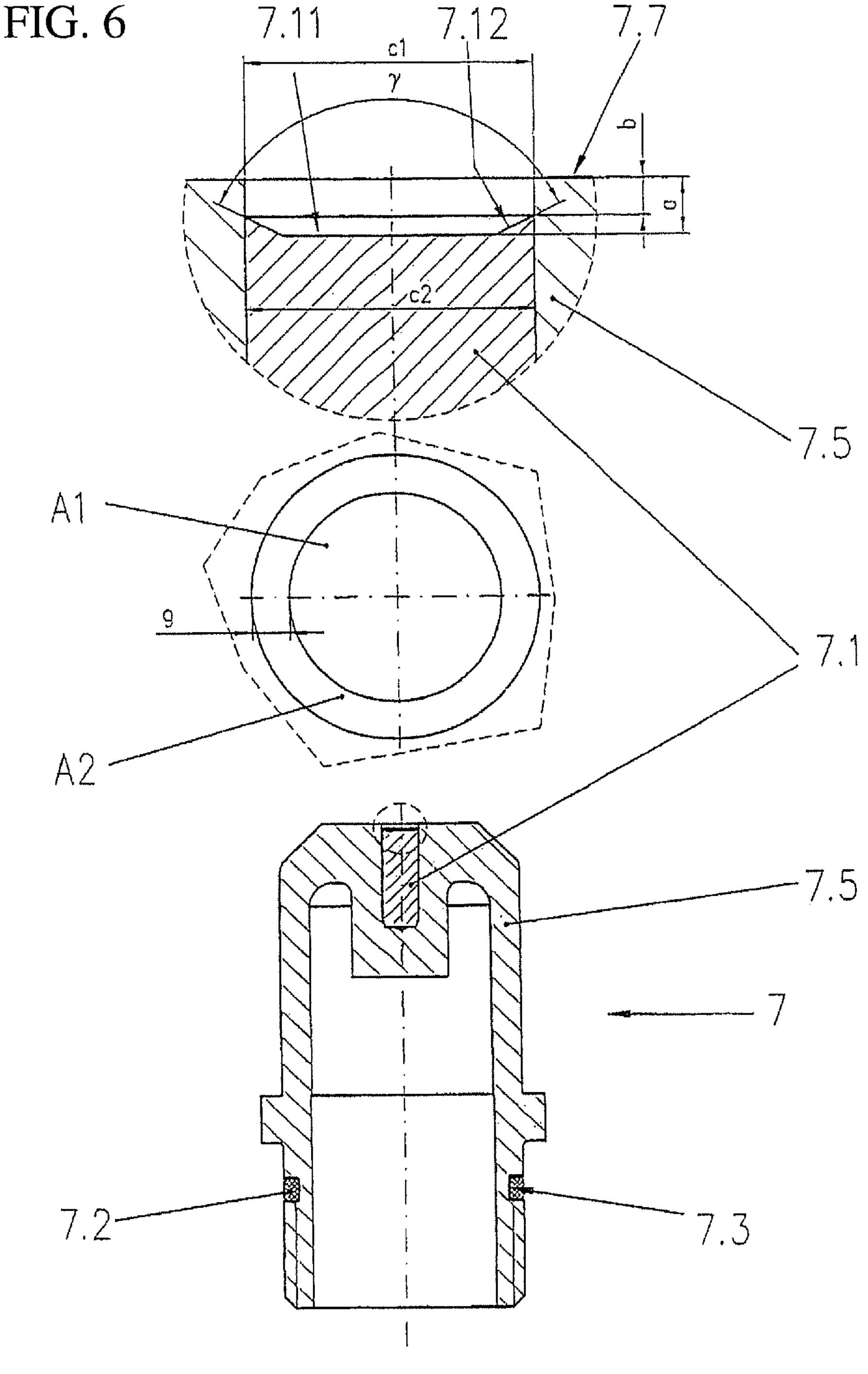
FIG. 6 depicts a view of an embodiment electrode of the invention in a longitudinal cross section and details of the emission inserts in a longitudinal cross section and in a view from the front.
Figure 7:
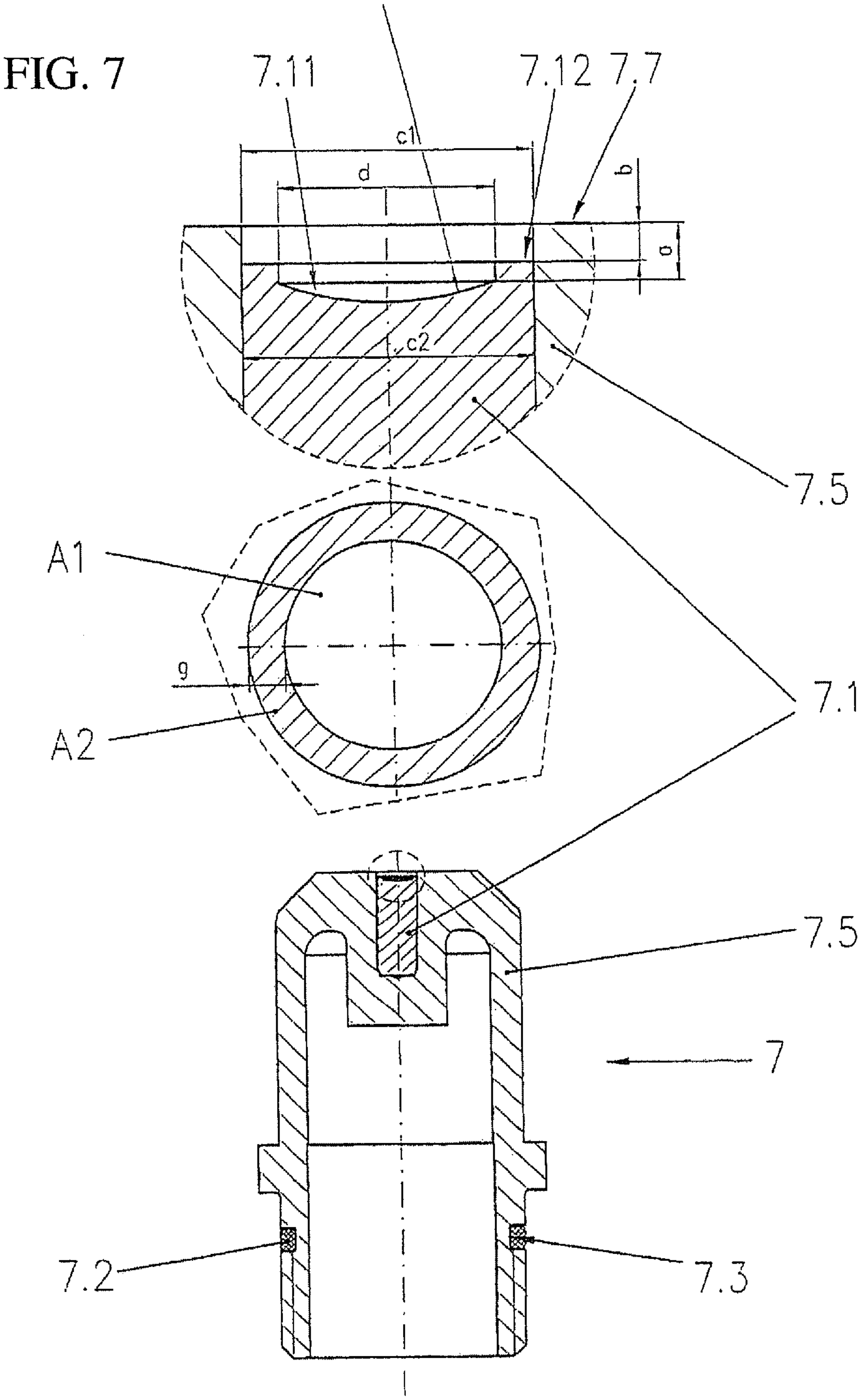
FIG. 7 depicts a view of an embodiment electrode of the invention in a longitudinal cross section and details of the emission inserts in a longitudinal cross section and in a view from the front.
Figure 8:
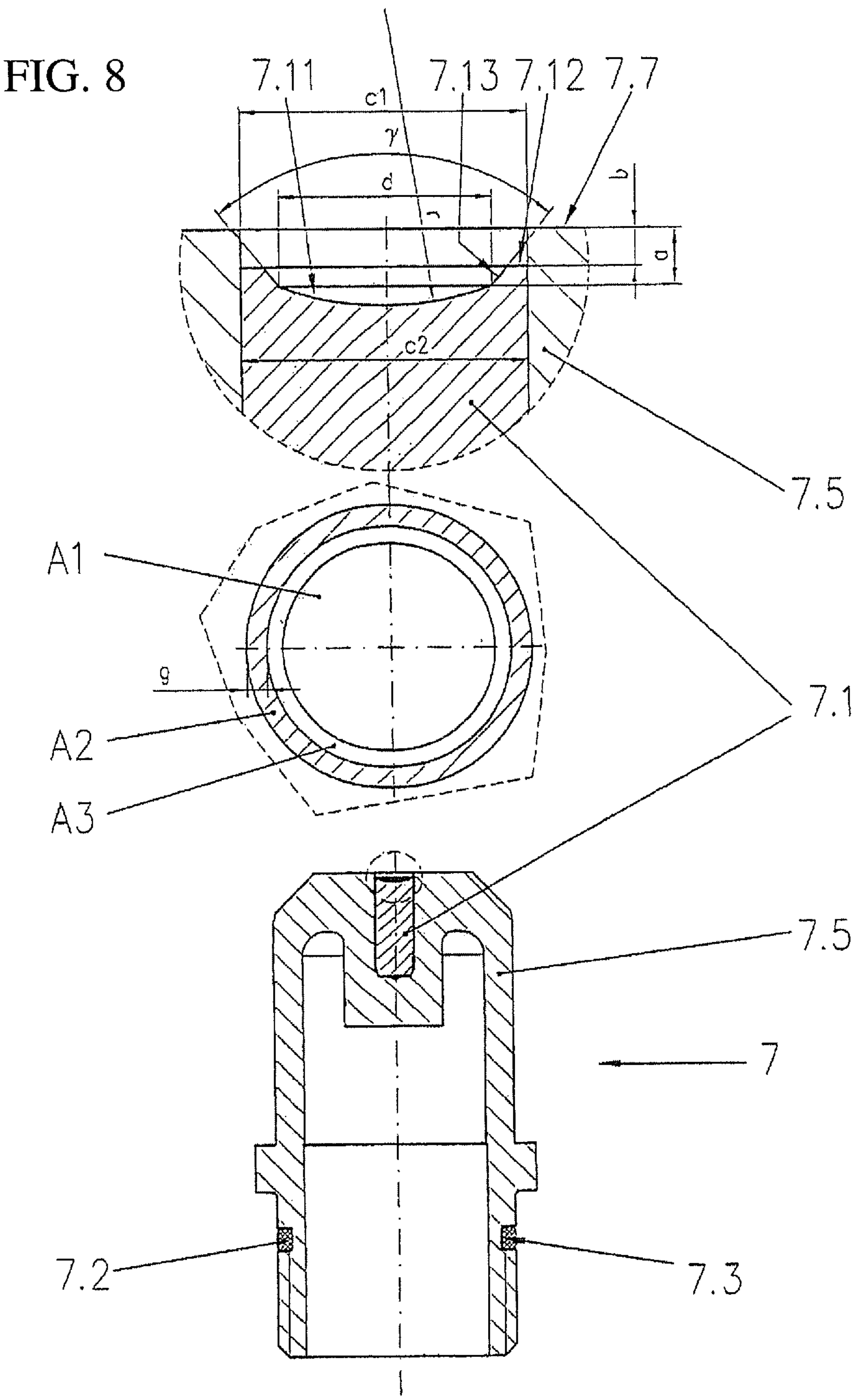
FIG. 8 depicts a view of an embodiment electrode of the invention in a longitudinal cross section and details of the emission inserts in a longitudinal cross section and in a view from the front.
Figure 9:
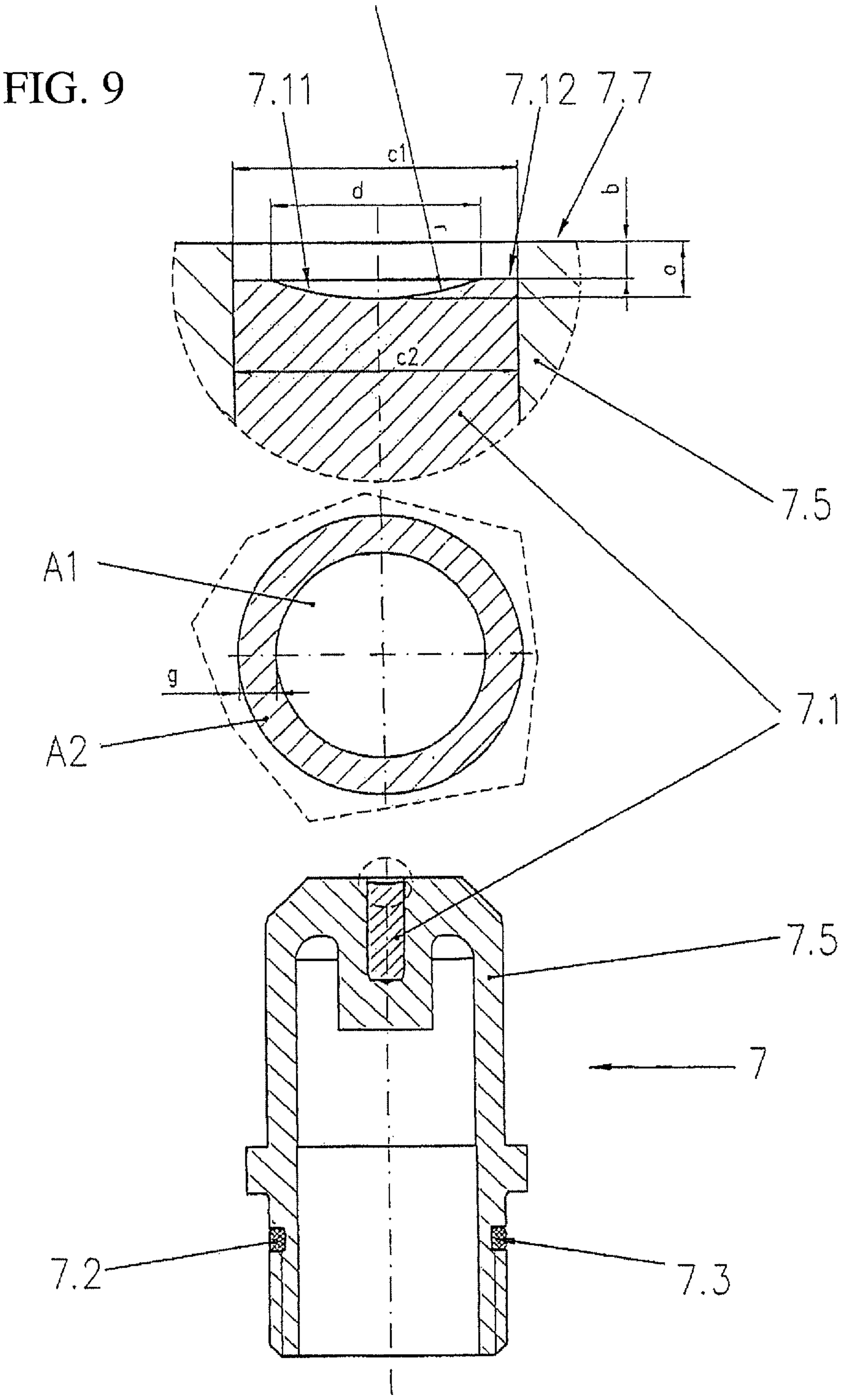
FIG. 9 depicts a view of an embodiment electrode of the invention in a longitudinal cross section and details of the emission inserts in a longitudinal cross section and in a view from the front.
Figure 10:
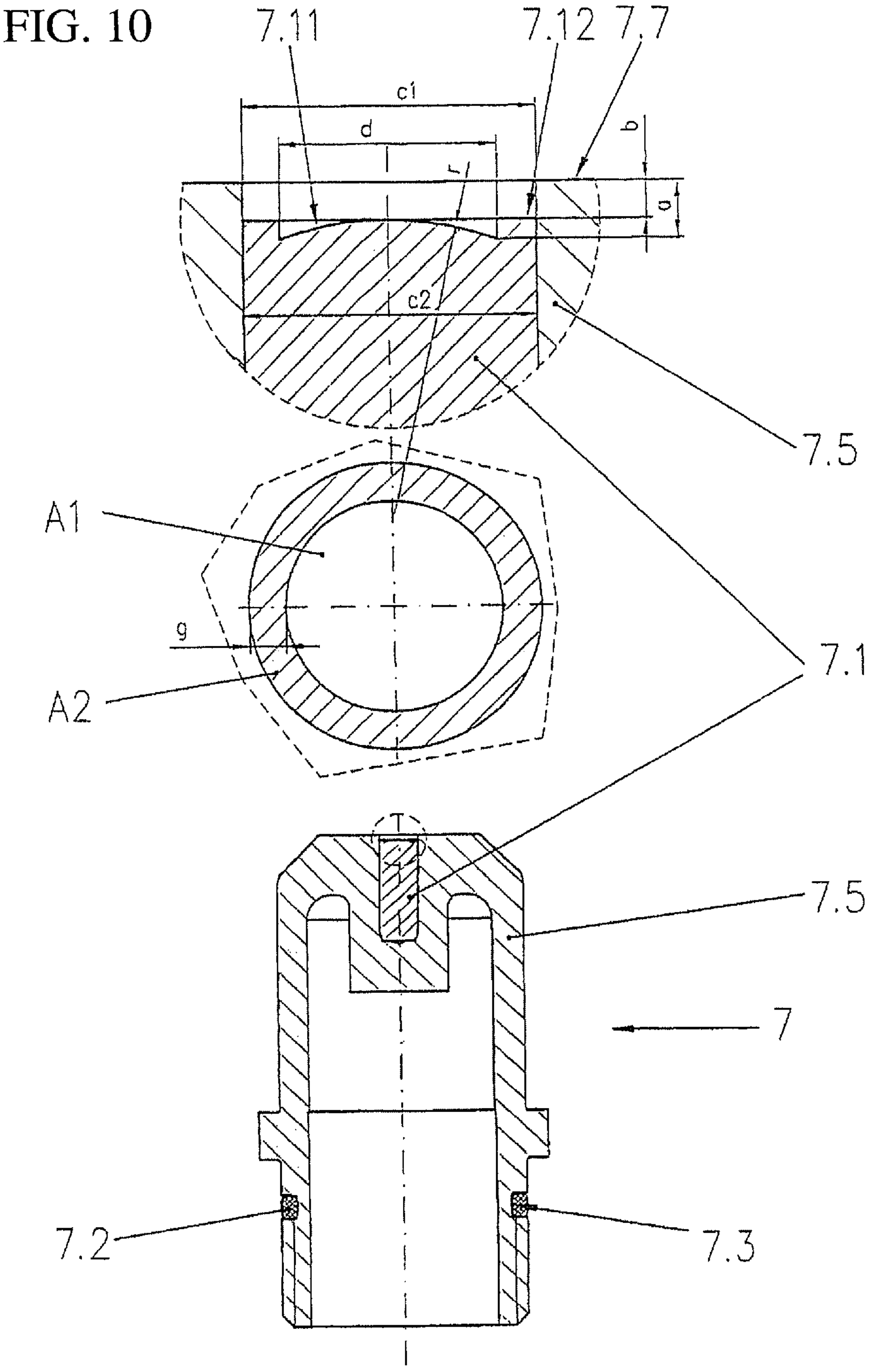
FIG. 10 depicts a view of an embodiment electrode of the invention in a longitudinal cross section and details of the emission inserts in a longitudinal cross section and in a view from the front.

Referring to FIG. 3, an electrode 7 is depicted prior to the introduction of the emission insert 7.1 into the electrode holder 7.5.

FIGS. 4 through 10 depict several contemplated embodiments of the electrode 7 of the invention, with each of FIGS. 4 through 10 depicting a contemplated embodiment electrode holder 7.5 and contemplated emission insert 7.1.

Referring to the several embodiments, consider the distance a between the surface 7.7 of the electrode holder 7.5 and the surface 7.11 of the emission insert 7.1, and the distance b between the surface 7.7 of the electrode holder 7.5 and the surface 7.12 of the emission insert 7.1, in which the following relationships apply:

$a>b$ $a=0.15$ mm to $0.5$ mm $b=0.1$ mm to $0.45$ mm $a \geq 1.3 \times b$ to $3 \times b$ The angle $\gamma$ in the surface of the emission insert 7.1 is preferably in the range from 0° to 120°.

The diameter c1 of the hole for the emission insert 7.1 in the electrode holder 7.5 is preferably in the range from 0.5 mm to 2.9 mm. In addition, the following preferably apply to the emission insert 7.1:

diameter c2: $c2=0.5$ mm to $2.9$ mm diameter d of the surface 7.11: $d=0.3$ mm to $2.7$ mm and $d \leq c2-0.2$ mm.

As to the rest, the following applies to the width g of the annular surface A2:

$g \geq 0.1$ mm$=(c2-d)/2$.

The angle $\beta$ of the emission insert 7.1 is preferably in the range from 10° to 90°, while the angle $\alpha$ of the hole in the electrode holder 7.5 is preferably in the range from 80° to 160°, where $\alpha>\beta$.

Figure 11:
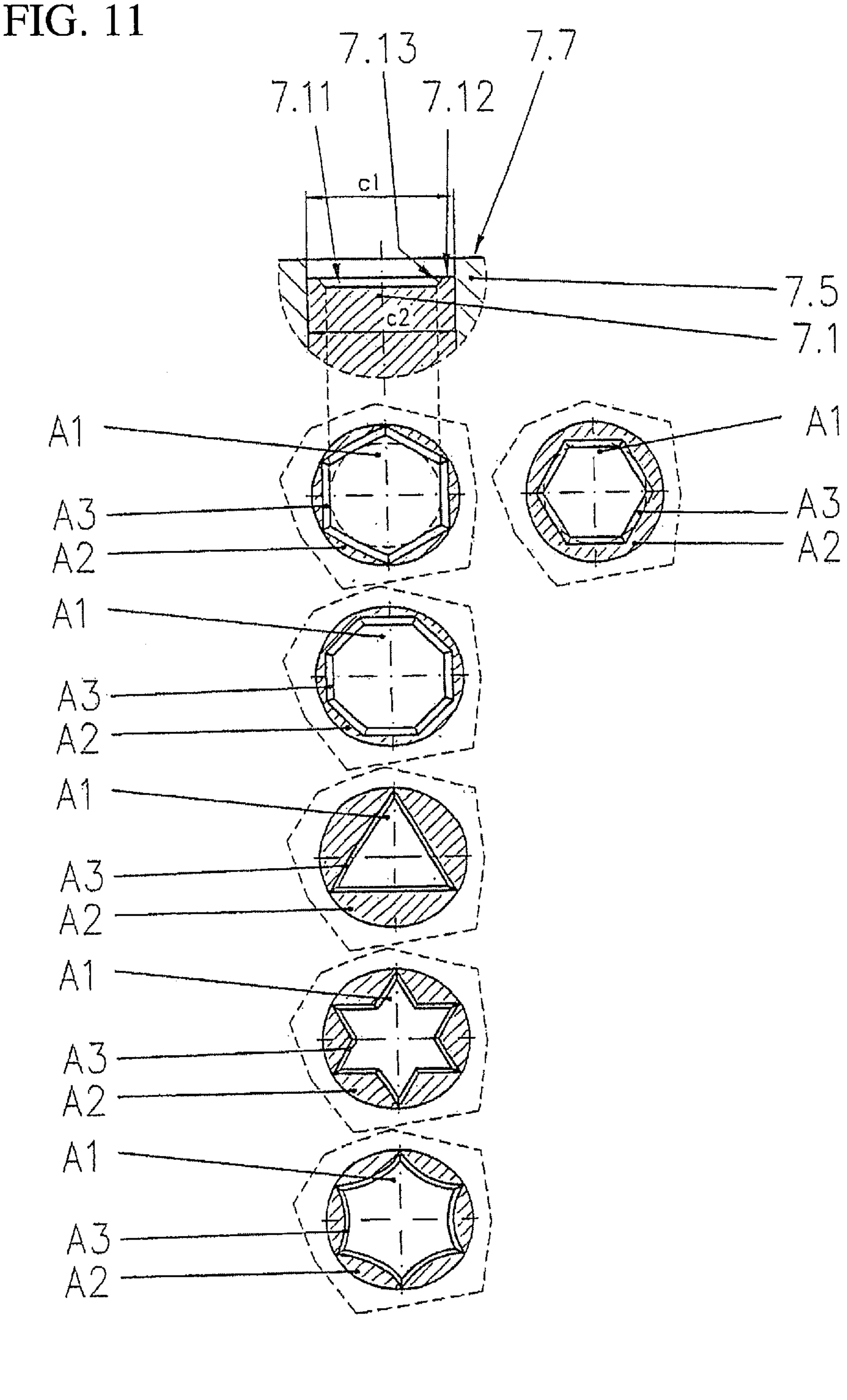
FIG. 11 shows surface shapes of particular embodiments of the emission insert from the front.

Referring now to FIG. 11, several different surface shapes of the emission insert 7.1 are depicted that are within the contemplated scope of the invention. The area A2 of the surface of the emission insert 7.1, adjacent the electrode holder 7.5, is at least as big as the minimum possible area A2 of the circular ring which results in the case of a circular design, depending on the diameter c2. Between the peripheral surface 7.12 and the central surface 7.11, it is also possible to provide a transitional surface 7.13 (e.g. inclined) with an area A3. The outer contours of the surfaces 7.11 and 7.13 may, for example, be triangular, polygonal, star-shaped, or the like.

The features of the invention disclosed in the above description, in the drawings, and in the claims, can be essential to implementing the invention in its various embodiments both individually and in any combination. Those skilled in the art will realize that this invention is capable of embodiments that are different from those shown and the details of the disclosed structures and descriptions can be changed in various manners without departing from the scope of the invention. Accordingly the drawings and descriptions are to be regarded as in including such equivalent configurations, structures, and arrangements as to not depart from the spirit and scope of the invention.

The invention claimed is:

1. An electrode for a plasma torch, comprising:

an elongated electrode holder, said electrode holder having an electrode tip, a front surface on said electrode tip, and a hole arranged in said electrode tip along a central axis through said electrode holder;

an emission insert having an emission surface, said emission insert being arranged in said hole such that said emission surface is exposed, and said emission insert located adjacent said front surface; and said emission surface being set back and recessed relative to said adjacent front surface of said electrode holder, said emission surface having a central surface and a peripheral surface, a distance a between said central surface of said emission insert and said front surface of said electrode holder is greater than a distance between said peripheral surface of said emission insert and said adjacent front surface of said electrode holder.

2. The electrode of claim 1 further comprising an end of said emission insert facing away from said electrode tip, said end being frustoconical.

3. The electrode of claim 1 further comprising an end of said emission insert facing away from said electrode tip, said end running frustoconically at an angle β in the range of about 10° to 90°.

4. The electrode of claim 1, said hole having a conical bottom.

5. The electrode of claim 4, said conical bottom having an angle α in the range of about 80° to 160°.

6. The electrode of claim 1, further comprising:

an electrode socket having an internal thread;

said electrode holder having an external thread and a groove running radially externally; and said electrode holder being screwed together with said electrode socket via said external thread and said internal thread and sealed.

7. The electrode of claim 6 further comprising an O-ring disposed in said groove for sealing.

8. An electrode for a plasma torch, comprising:

an elongated electrode holder, said electrode holder having an electrode tip, a front surface on said electrode tip, and a hole arranged in said electrode tip along a central axis through said electrode holder;

an emission insert having an emission surface, said emission insert being arranged in said hole such that said emission surface is exposed, and said emission insert located adjacent said front surface; and said emission surface being set back and recessed relative to said adjacent front surface of said electrode holder, said emission surface including a central surface and a peripheral surface, said peripheral surface being inclined.

9. The electrode of claim 8 further comprising an end of said emission insert facing away from said electrode tip, said end being frustoconical.

10. The electrode of claim 9 further comprising an end of said emission insert facing away from said electrode tip, said end running frustoconically at an angle β in the range of about 10° to 90°.

11. The electrode of claim 9, said hole having a conical bottom.

12. The electrode of claim 11, said conical bottom having an angle α in the range of about 80° to 160°.

13. The electrode of claim 8, further comprising:

an electrode socket having an internal thread;

said electrode holder having an external thread and a groove running radially externally; and said electrode holder being screwed together with said electrode socket via said external thread and said internal thread and sealed.

14. The electrode of claim 13 further comprising an O-ring disposed in said groove for sealing.

15. A plasma torch head comprising:

an electrode and an elongated electrode holder, said electrode holder having an electrode tip, a front surface on said electrode tip, and a hole arranged in said electrode tip along a central axis through said electrode holder;

an emission insert having an emission surface, said emission insert being arranged in said hole such that said emission surface is exposed, and said emission insert located adjacent said front surface; and said emission surface being set back and recessed relative to said adjacent front surface of said electrode holder, said emission surface having a central surface and a peripheral surface, a distance a between said central surface of said emission insert and said front surface of said electrode holder is greater than a distance b between said peripheral surface of said emission insert and said adjacent front surface of said electrode holder.

16. The plasma torch head of claim 15 further comprising an end of said emission insert facing away from said electrode tip, said end being frustoconical.

17. The plasma torch head of claim 15 further comprising an end of said emission insert facing away from said electrode tip, said end running frustoconically at an angle β in the range of about 10° to 90°.

18. The plasma torch head of claim 15, said hole having a conical bottom.

19. The plasma torch head claim 18, said conical bottom having an angle α in the range of about 80° to 160°.

20. The plasma torch head of claim 15, further comprising:

an electrode socket having an internal thread;

said electrode holder having an external thread and a groove running radially externally; and said electrode holder being screwed together with said electrode socket via said external thread and said internal thread and sealed.

21. The plasma torch head of claim 20 further comprising an O-ring disposed in said groove for sealing.

22. A plasma torch head, comprising:

an electrode and an elongated electrode holder, said electrode holder having an electrode tip, a front surface on said electrode tip, and a hole arranged in said electrode tip along a central axis through said electrode holder;

an emission insert having an emission surface, said emission insert being arranged in said hole such that said emission surface is exposed, and said emission insert located adjacent said front surface; and said emission surface being set back and recessed relative to said adjacent front surface of said electrode holder, said emission surface including a central surface and a peripheral surface, said peripheral surface being inclined.

23. The plasma torch head of claim 22 further comprising an end of said emission insert facing away from said electrode tip, said end being frustoconical.

24. The plasma torch head of claim 23 further comprising an end of said emission insert facing away from said electrode tip, said end running frustoconically at an angle β in the range of about 10° to 90°.

25. The plasma torch head of claim 23, said hole having a conical bottom.

26. The plasma torch head of claim 25, said conical bottom having an angle α in the range of about 80° to 160°.

27. The plasma torch head of claim 22, further comprising:

an electrode socket having an internal thread;

said electrode holder having an external thread and a groove running radially externally; and said electrode holder being screwed together with said electrode socket via said external thread and said internal thread and sealed.

28. The plasma torch head of claim 22 further comprising an O-ring disposed in said groove for sealing.

* * * * *